United States Patent [19]
Fujimoto et al.

[11] 3,709,737
[45] Jan. 9, 1973

[54] LEAKPROOF BATTERY AND METHOD OF MANUFACTURING THE SAME

[75] Inventors: Tadasu Fujimoto; Kotofusa Kuroda; Akira Yamamoto, all of Takatsuki, Japan

[73] Assignee: Yuasa Battery Company, Limited, Takatsuki, Osaka Prefecture, Japan

[22] Filed: Sept. 30, 1970

[21] Appl. No.: 76,902

[30] Foreign Application Priority Data

April 24, 1970 Japan ........................... 45/35820
April 24, 1970 Japan ........................... 45/35821
April 24, 1970 Japan ........................... 45/35822

[52] U.S. Cl. ............... 136/148, 136/158, 136/176
[51] Int. Cl. ........................ H01m 3/02, H01m 9/02
[58] Field of Search ...... 136/143, 144, 146, 148, 157, 136/158, 176

[56] References Cited

UNITED STATES PATENTS 2,912,479  11/1959  Poole ............................... 136/146
2,505,353  4/1950   Fisk ................................. 136/146
2,772,322  11/1956  Witt et al. ........................ 136/148

FOREIGN PATENTS OR APPLICATIONS 757,102  9/1956  Great Britain ..................... 136/144

Primary Examiner—Donald L. Walton
Attorney—Watson, Cole, Grindle & Watson

[57] ABSTRACT

This invention relates to a method of manufacturing a leakproof battery, the battery being of the construction in which a composition of a mixture of hydrated silica gel with thermoplastic synthetic resin is placed around a plate group, heated in saturated steam above 100°C and solidified into a liquid absorbable porous body integral with the plate group, and the liquid absorbable porous body is impregnated with an electrolyte and mounted in a battery container. Alternatively, the battery container itself can be used as the mold.

4 Claims, 6 Drawing Figures

PATENTED JAN 9 1973

INVENTOR
Tadasu Fujimoto
Kotojusa Kuroda
Akira Yamamoto
BY
Watson, Cole, Grindle & Watson
ATTORNEY

LEAKPROOF BATTERY AND METHOD OF MANUFACTURING THE SAME

This invention relates to leakproof batteries, and more particularly to a method of manufacturing the same. Conventionally included under means for fixing the electrolyte of a battery are a method of using an acid resisting porous body, such as a glass mat, a sheet made of animal fiber and vegetable fiber, non-woven felt-like fabric, pumice powder, diatomaceous earth, as an electrolyte holding body and disposing the porous body in the interstices between plates and around a plate group. In another known method, a so-called colloidal battery is produced by adding sulphuric acid to sodium silicate or commercially obtainable silica sol, stirring the mixture and pouring the same into a battery and gelatinizing it into a porous electrolyte holding body. But the former method has disadvantages; it cannot rid itself of a fluid electrolyte; namely, if there is a fluid electrolyte present in the battery, there is a possibility of the electrolyte leaking from a filling hole, a vent hole or jointed portions when the battery falls or because of the gas produced at the end of charging the battery. The electrolyte that leaked may sometimes corrode appliances and implements; and in such an instance where the battery is used with toys, users of the battery are children and accordingly the battery is handled carelessly, and hence the electrolyte tends to leak anyway. In such a case if it should leak, there is a fear of the children being subjected to burns and accordingly such a battery is very dangerous and undesirable from a safety viewpoint. Further, the latter method is not free form disadvantages either; namely, the colloid in the form of an electrolyte holding body is very weak, and a decrease in the liquid made by increasing the number of charges and discharges cleaves colloid and causes capacity deterioration.

A primary object of the invention is to obtain a leakproof battery that is free from electrolyte leakage from a battery container.

Another object of the invention is to obtain a battery of high performance free from reduction in the porosity of silica gel and having a liquid absorbable highly porous body.

Still another object of the invention is to provide a battery that is very simple and inexpensive to assemble.

Yet another object of the invention is to fix the electrolyte by means of a liquid absorbable porous body and to satisfactorily fix plates and prevent active material from falling off.

These and other objects and advantages of the invention will become apparent from the following specification taken in conjunction with the accompanying drawings in which.

The battery provided by this invention is of the construction in which a composition of a mixture of powdered thermoplastic synthetic resin with hydrated silica gel in the form of a pore-building material is disposed in the interstices between a plate group and a container, heated in an atmosphere of saturated steam, and solidified into a liquid absorbable porous body with which the plate group is covered and fixed firmly.

EXAMPLE 1

Figure 1:
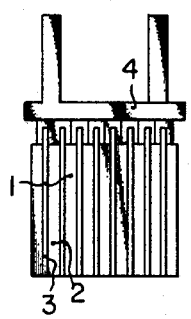
FIG. 1 is a perspective view of the plate group.
Figure 2:
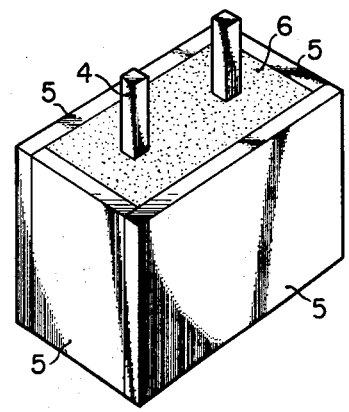
FIG. 2 is a perspective view showing a mold which is the same size and shape as a battery container receiving therein the plate group shown in FIG. 1 and into which mixed powder for constituting a liquid absorbable porous body is poured.
Figure 3:
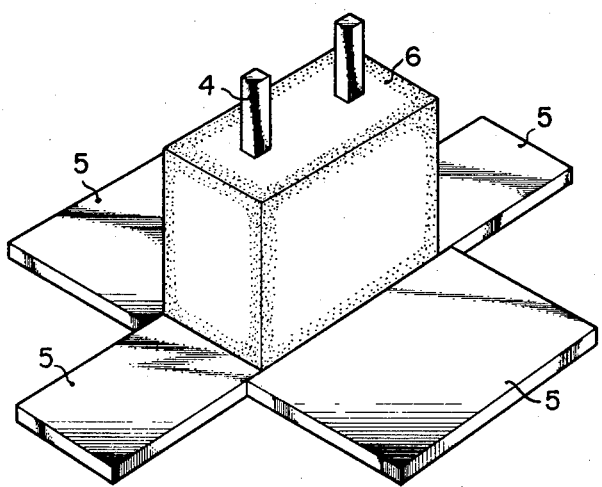
FIG. 3 is a perspective view showing the mold of FIG. 2 disassembled.
Figure 4:
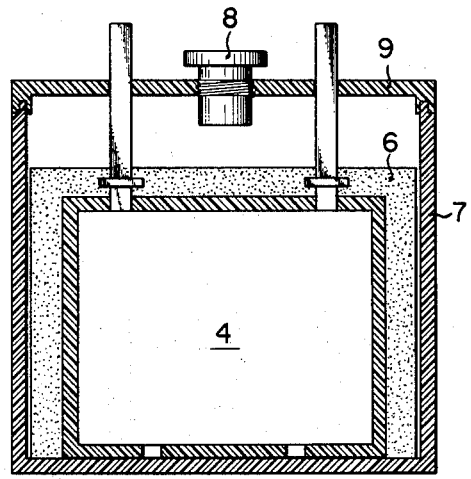
FIG. 4 is a longitudinal sectional front view showing the composition shown in FIG. 3 placed in the battery container after the composition has been treated.

This is a method of integrating a plate group and a liquid absorbable porous body by the use of a molding frame. The material used for the liquid absorbable porous body for covering and fixing the plate group was a composition of the mixture of one part by weight of high density polyethylene powder (50–300 mesh) with three parts by weight of hydrated silica gel powder (a water content of 70 percent and 50–300 mesh). As shown in FIG. 1, a plate group 4, having an acid resisting separator 3 interposed between a lead dioxide positive plate 1 and a lead negative plate 2, was enclosed by a collapsible metallic frame made of four plates and which was the same size and shape as a battery container. Then, powdered composition 6 was filled between the plate group 4 and the inner circumference of the molding frame 5. In this case, the interstices between the plate group and the molding frame were rapidly filled by imparting slight vibration to the molding frame. The molding frame 5 filled with the powdered composition 6 was left in saturated steam at a temperature of more than 100° C at 5–9 kg/cm² at. for ½–2 hours, and when polyethylene in the composition was melted and solidified, the mold frame was taken from the saturated steam into the atmosphere and collapsed as shown in FIG. 3, whereupon a plate group covered with a porous body that was 70–80 percent porosity, requiring no surface active agent treatment, having excellent absorbability and mechanically strong was obtained. The plate group covered with the liquid absorbable porous body obtained by the method described was dried in hot air below 100° C and thereafter was dipped in a specified electrolyte, for example a diluted sulphuric acid bath of 1,240 specific gravity, of to impregnate the porous body with the electrolyte. The porous body thus treated was placed into battery container 7 and a lid 9 having a filling plug 8 was placed on battery container 7 (FIG. 4).

EXAMPLE 2

This is a method of integrating a plate group and a liquid absorbable porous body in a battery container. In this example no molding frame is used in order to more efficiently obtain a plate group covered with a liquid absorbable porous body. The plate group was placed in a battery container 7 formed by thermoplastic resin, thermosetting resin, ebonite that can resist saturated steam at a temperature of over 100° C for ½–2 hours. A composition of powdered mixture as in Example 1 was filled between the plates and between the interstices of the plate group and the container and was left in saturated steam at a temperature above 100° C and which melted the synthetic resin, and was subsequently heated. Thereby, a battery was obtained in which the plate group, the liquid absorbable porous body and the container were formed in one whole body. In this method, as there is no necessity of using any particular molding frame, a battery can be manufactured at low cost. Also, as it can save labor, it is suitable for mass production.

EXAMPLE 3

Figure 5:
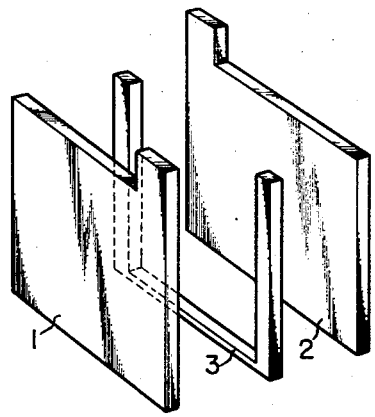
FIG. 5 is a perspective view of a set of a positive and a negative plate between which a special separator is used.

This is a method wherein no plate-like separator is used between the plates. As shown in FIG. 5, a plate group was formed by parallelly disposing several sets of assemblies each comprising a U-shaped separator 3 placed between a lead dioxide positive plate 1 and a lead negative plate 2, and was placed in the molding frame in the same manner as in Example 1. Then a composition 6 of a mixture of one part of powdered polyethylene with two-three parts of powdered hydrated silica gel was filled between the plate group members and the molding frame and between the plates while vibration was being imparted to the frame. The molding frame thus filled with the composition 6 was left in saturated steam at a temperature of over 100° C for ½-2 hours, heated, solidified and was then exposed to the atmosphere. The battery manufactured in this manner had a liquid absorbable porous body formed between the plates without the use of a plate-like separator. Accordingly, such a battery has an advantage of impregnating itself with a large quantity of electrolyte. Additionally, besides the above U-shaped separating material, a V-shaped separating material, a pectinated separating material, and a wave-like perforated plate may be used, as well as materials of every description and size can be used as a separating material, so long as a suitable space is provided between the plates as provided by the use of plates covered on their side edge portions with a synthetic resin sheath.

EXAMPLE 4

Figure 6:
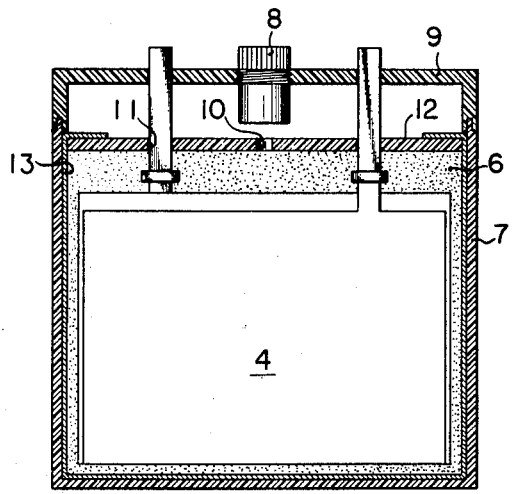
FIG. 6 is a longitudinal sectional front view of the plate group of FIG. 4 packed in a bag and received in the container.

This is a method wherein an integral combination of a plate group and a liquid absorbable porous body are covered with a bag 13 as shown in FIG. 6. According to the method, a plate group 4 was placed in a suitable molding frame or battery container, and the composition 6 of a mixture of one part by weight of powdered polyethylene with three parts by weight of powdered hydrated silica gel was uniformly filled on the circumference of the plate group and in the interstices between the plates and was heated in saturated steam at a temperature of over 100° C at 4-5 kg/cm² at. The resulting structure was solidified to form a liquid absorbable porous body with the plate group, and was dried and thereafter dipped in an electrolyte for about ½-1 hour under reduced pressure and then removed from the electrolyte. Thereafter, a cover plate 12 made of an acid resisting, oxidation resisting rubber or synthetic resin was placed on the top of the plate group, cover plate 12 having an air hole 10 and holes 11 for passing electrodes therethrough. Next, the block was put into a bag 13 of heat-shrinkable synthetic resin, for example vinyl chloride, polyethylene, silicon resin, and was thermally treated with hot water or hot air from outside to shrink the bag 13 to cover the liquid absorbable porous body therewith. If, in this case, an adhesive agent is previously applied to the surface of the cover plate, such application will prove more effective in that the adhesion between the bag and the cover plate prevents the liquid from leaking.

In the invention, a composition of a mixture of hydrated silica gel with powdered thermoplastic synthetic resin is disposed between the plates and around the plate group, heated in saturated steam at a temperature above the softening temperature of the resin and solidified to obtain a liquid absorbable porous body. Since the composition is heated above the softening temperature of the resin, resin particles are melted and chained in a threadlike manner along the points of contact of silica gel powder, while the water in the hydrated silica gel is evaporated. Because the hydrated silica gel is heated in saturated steam, the hydrated silica gel, unlike drying effected in the normal hot air, undergoes no volume shrinkage, and accordingly the molten polyethylene is interrupted by the silica gel and is chained in a narrow threadlike manner along the points of contact between the silica gel particles and there is thus no possibility of forming a partial concentration or of covering the silica gel completely. This is an advantangeous characteristic achieved by heating in saturated steam. Moreover, continuous fine pores of about 30 μ are uniformly formed in the silica gel, and a general porosity of about 70 percent can be obtained.

The types of synthetic resins of the liquid absorbable porous body used in the invention and the mixing ratios of the synthetic resins to silica gel are shown in the following table.

TABLE

| No. | Type of synthetic resin | Water content of silica gel, percent | Mixing ratio (parts by weight) Resin | Silica gel | Atmosphere in time of sintering | Porosity of porous body, percent | Properties of porous body |
|---|---|---|---|---|---|---|---|
| A | Polyethylene | 70 | 2 | 4 | In saturated steam | 69 | Hard. |
| B | do | 70 | 2 | 5 | do | 72 | Do. |
| C | do | 70 | 2 | 10 | do | 79 | Soft, easily pulverizable. |
| D | do | 40 | 2 | 5 | do | 64 | Hard. |
| E | Polyvinyl chloride | 70 | 3 | 2 | do | 55 | Do. |
| F | ABS | 70 | 2 | 2 | do | 49 | Do. |
| G | ABS | 70 | 2 | 3 | do | 59 | Do. |
| H | Polypropylene | 70 | 2 | 4 | do | 63 | Do. |
| I | do | 70 | 2 | 5 | do | 91 | Do. |
| J | General-purpose styrol | 70 | 2 | 5 | do | 73 | Do. |
| K | High impact styrol | 70 | 2 | 2 | do | 51 | Do. |
| L | Low-pressure polyethylene | 70 | 2 | 5 | do | 71 | Do. |
| M | Polyamides resin | 70 | 2 | 3 | do | 61 | Do. |
| N | Polyethylene | 70 | 2 | 5 | In hot air | 37 | Do. |
| O | do | 70 | 2 | 10 | do | 42 | Hard, but fragile. |

The determination of porosity can be made from the following formula $$P = (W_1 - W)/(W_1 - W_2) \times 100\%$$

in which $W$ represents the weight of a porous body; $W_1$ the weight of the porous body having the pores thereof completely filled with water; $W_2$ the weight of the porous body in the water; and P represents porosity (%).

In the table shown, A–M show the properties of a porous body according to the invention. N and O indicate examples in which the sintering was made in hot air and in which the porous bodies obtained were greatly different even if other conditions were the same as in B and C. The porosity and strength shown can be freely selected by changing the mixing ratio of hydrated silica gel to thermoplastic resin to a ratio in the range of one - seven parts of hydrated silica gel to one part of thermoplastic resin. Heating conditions may vary with synthetic resins, but are above the softening temperature of the respective resins and particularly desirably in the neighborhood of the softening temperature. The liquid absorbable porous body of the invention has high porosity and is capable of holding a large quantity of electrolyte. Even if the electrolyte comes out in bubbles on the surface of the porous body as a result of gas generated within the battery, the bubbles break immediately and the electrolyte is absorbed by the porous body, and hence there is no possibility of the bubbles bursting into a fluid electrolyte. Accordingly, the porous body of the invention makes it unnecessary to particularly improve the structure of a battery but can be advantageously used in an ordinary type of a battery container. Furthermore, it is another advantage of the invention that, since the plate group is covered and firmly fixed by the liquid absorbable porous body, the battery is protected against damage by hard vibration and shocks and can prevent falling of the active material.

Also, in a conventional type of battery it is troublesome to lay plates, separators, glass mats one over another, but this invention can advantageously simplify the assembling step of the battery as by resorting to the method shown in Example 3.

It should be understood that this invention has been described with reference to the examples of a lead acid storage battery but that the invention is not limited thereto but can be applied to various other batteries such as an alkaline storage battery without departing from the scope and spirit of the invention.

What is claimed is:

1. A method of manufacturing a leakproof battery comprising the steps of forming a mixture of thermoplastic synthetic resin powder and hydrated silica gel around an assembly of positive and negative plates;

enclosing said composition and plates and heating the same in saturated steam at a temperature exceeding 100° C, said temperature being sufficiently high to soften and melt at least a portion of said resin powder;

solidifying said resin thereby forming a liquid absorbable porous body integral with said negative and positive plates;

impregnating said absorbable porous body with an electrolyte; and inserting said absorbable porous body and said positive and negative plates within a battery container.

2. A method according to claim 1 wherein said mixture comprises one part by weight of high density polyethylene powder and three parts by weight of hydrated silica gel powder.

3. A method as in claim 1 wherein said integrated liquid absorbable porous body is dried in hot air below 100° C prior to impregnating with an electrolyte.

4. A method of manufacturing a leakproof battery comprising the steps of forming a mixture of thermoplastic synthetic resin powder and hydrated silica gel around a group of positive and negative plates within the battery container;

heating said battery container in saturated steam at a temperature of over 100° C, said temperature being sufficiently high to soften and melt at least a portion of said resin powder;

solidifying said resin to form a liquid absorbable porous body integrally formed with said positive and negative plates within said battery container; and impregnating said absorbable porous body with an electrolyte.

* * * * *